United States Patent
Farooq et al.

(10) Patent No.: US 11,827,168 B2
(45) Date of Patent: Nov. 28, 2023

(54) DOWNWARDLY-DEPLOYABLE BUMPER EXTENSION

(71) Applicant: Ford Global Technologies, LLC, Dearborn, MI (US)

(72) Inventors: S. M. Iskander Farooq, Novi, MI (US); Dean M. Jaradi, Macomb, MI (US); Mohammad Omar Faruque, Ann Arbor, MI (US); Saeed D. Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/665,691

(22) Filed: Feb. 7, 2022

(65) Prior Publication Data

US 2023/0249636 A1    Aug. 10, 2023

(51) Int. Cl.
*B60R 19/40*    (2006.01)

(52) U.S. Cl.
CPC .................................. *B60R 19/40* (2013.01)

(58) Field of Classification Search
CPC ....... B60R 19/02; B60R 19/023; B60R 19/38; B60R 19/40; B60R 19/54
USPC .......................................................... 293/118
See application file for complete search history.

(56) References Cited

U.S. PATENT DOCUMENTS

| | | | |
|---|---|---|---|
| 4,659,130 A * | 4/1987 | Dimora | B62D 35/005 296/180.1 |
| 4,770,457 A | 9/1988 | Tomforde | |
| 6,394,512 B1 * | 5/2002 | Schuster | B60R 19/12 293/118 |
| 6,764,118 B2 * | 7/2004 | DePottey | B60R 19/40 293/118 |
| 7,237,828 B2 | 7/2007 | Frederick et al. | |
| 7,686,382 B2 | 3/2010 | Rober et al. | |
| 7,757,804 B1 | 7/2010 | Li | |
| 8,702,152 B1 | 4/2014 | Platto et al. | |
| 9,156,420 B2 | 10/2015 | Fukawatase | |
| 9,227,585 B1 | 1/2016 | Barbat et al. | |
| 9,550,464 B2 | 1/2017 | Revankar et al. | |
| 9,586,555 B2 | 3/2017 | Revankar et al. | |
| 9,783,153 B2 | 10/2017 | Farooq et al. | |
| 9,821,754 B2 | 11/2017 | Farooq et al. | |
| 10,787,139 B2 * | 9/2020 | Farooq | B60R 19/38 |
| 2004/0046403 A1 | 3/2004 | DePottey et al. | |
| 2004/0189024 A1 | 9/2004 | Lindsey | |
| 2007/0125589 A1 | 6/2007 | Murphy | |
| 2011/0172882 A1 | 7/2011 | Schrader | |

(Continued)

FOREIGN PATENT DOCUMENTS

DE    102005053960 A1    5/2006

*Primary Examiner* — Jason S Daniels
(74) *Attorney, Agent, or Firm* — Frank A. MacKenzie; Bejin Bieneman PLC

(57) ABSTRACT

A vehicle includes a vehicle frame and a bumper supported by the vehicle frame. A bumper extension is supported by the bumper and is moveable downwardly relative to the bumper from a raised position to a lowered position. A reinforcement has a first end fixed relative to vehicle frame and a second end fixed relative to the bumper extension. The reinforcement includes a lock fixing the first end and the second end of the reinforcement relative to each other when the bumper extension is in the lowered position.

19 Claims, 8 Drawing Sheets

(56) References Cited

U.S. PATENT DOCUMENTS

| | | | |
|---|---|---|---|
| 2015/0183395 A1* | 7/2015 | Revankar | B60R 19/40 180/274 |
| 2015/0283967 A1* | 10/2015 | Cuddihy | B60R 19/023 293/118 |
| 2017/0088091 A1 | 3/2017 | Ginn et al. | |
| 2019/0275981 A1 | 9/2019 | Farooq et al. | |

* cited by examiner

DOWNWARDLY-DEPLOYABLE BUMPER EXTENSION

BACKGROUND

Vehicles include exterior energy absorption features for absorbing energy during vehicle-to-vehicle impacts including vehicle-frontal impacts and vehicle-rear impacts. For example, these features can include crushable bumpers, crush cans, vehicle-frame crush zones or deformation zones, etc. When these energy absorption features on both colliding vehicles are vertically aligned, the energy absorption features of both vehicles operate to absorb energy from the collision.

Vehicles of various sizes have different ride heights. For example, sport-utility vehicles (SUVs) and pickup trucks generally ride higher than sedans and minivans.

DETAILED DESCRIPTION

Figure 1:
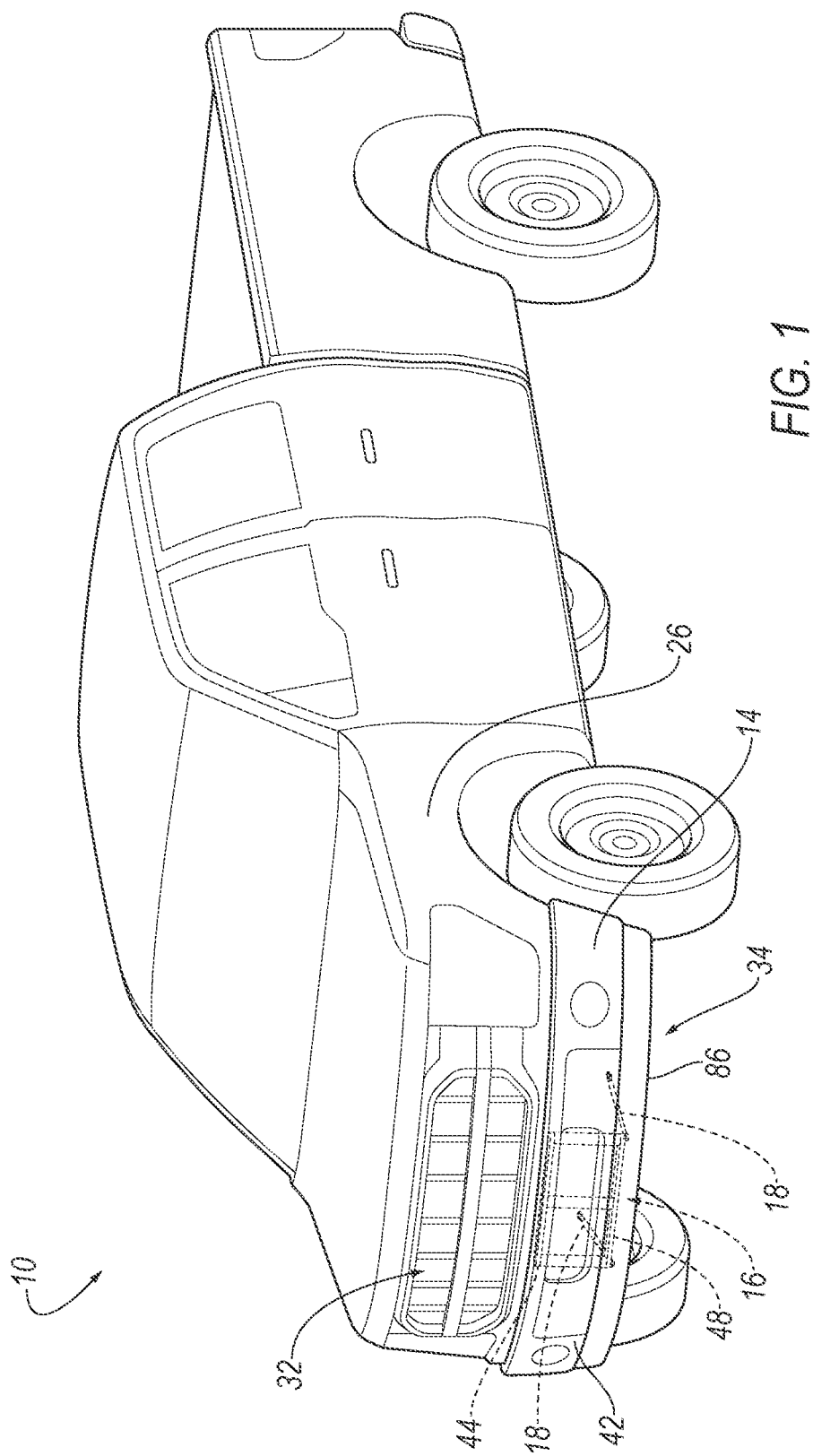
FIG. 1 is a perspective view of a vehicle with a bumper extension shown in hidden lines in a raised position.

A vehicle includes a vehicle frame and a bumper supported by the vehicle frame. A bumper extension is supported by the bumper and is moveable downwardly relative to the bumper from a raised position to a lowered position. A reinforcement has a first end fixed relative to vehicle frame and a second end fixed relative to the bumper extension. The reinforcement includes a lock fixing the first end and the second end of the reinforcement relative to each other when the bumper extension is in the lowered position.

The reinforcement may have a first rod having the first end and a second rod having a second end, the first rod and the second rod being telescopically coupled with each other. The lock may fix the first rod to the second rod when the bumper extension is in the lowered position. The lock may allow relative movement of the first rod and the second rod before movement of the bumper extension to the lowered position. The lock may include a spring-loaded pin on one of the first rod and second rod and the other of the first rod and second rod may include a hole that receives the spring-loaded pin when the bumper extension is in the lowered position. The lock may be supported by one of the first rod and second rod and may engage the other of the first rod and second rod when the bumper extension is in the lowered position.

The bumper extension may be telescopically coupled to the bumper.

The bumper extension may include base fixed relative to the bumper and moveable member telescopically engaged with the base of the bumper extension. The moveable member may include two rods telescopically engaged with the base and a cross member extending from one rod to the other rod. A pyrotechnic device may be between the base and the moveable member.

A linear actuator may be between the bumper and the bumper extension.

The bumper extension may be centered cross-vehicle on the bumper.

A bottom-most surface of the bumper extension may be below a bottom-most surface of the bumper when the bumper extension is in the lowered position.

A computer may have a processor and a memory storing instructions executable by the processor to move the bumper extension to the lowered position in response to detected frontal-vehicle impact. A pyrotechnic device may be between the bumper and the bumper extension, the memory storing instructions executable by the processor to activate the pyrotechnic device in response to detected frontal-vehicle impact.

The reinforcement may be hinged to the bumper extension and the vehicle frame.

With reference to the Figures, wherein like numerals indicate like parts throughout the several views, a vehicle 10 includes a vehicle frame 12 and a bumper 14 supported by the vehicle frame 12. A bumper extension 16 is supported by the bumper 14 and is moveable downwardly relative to the bumper 14 from a raised position to a lowered position. A reinforcement 18 has a first end 20 fixed relative to vehicle frame 12 and a second end 22 fixed relative to the bumper extension 16. The reinforcement 18 includes a lock 24 fixing the first end 20 and the second end 22 of the reinforcement 18 relative to each other when the bumper extension 16 is in the lowered position.

Figure 2:
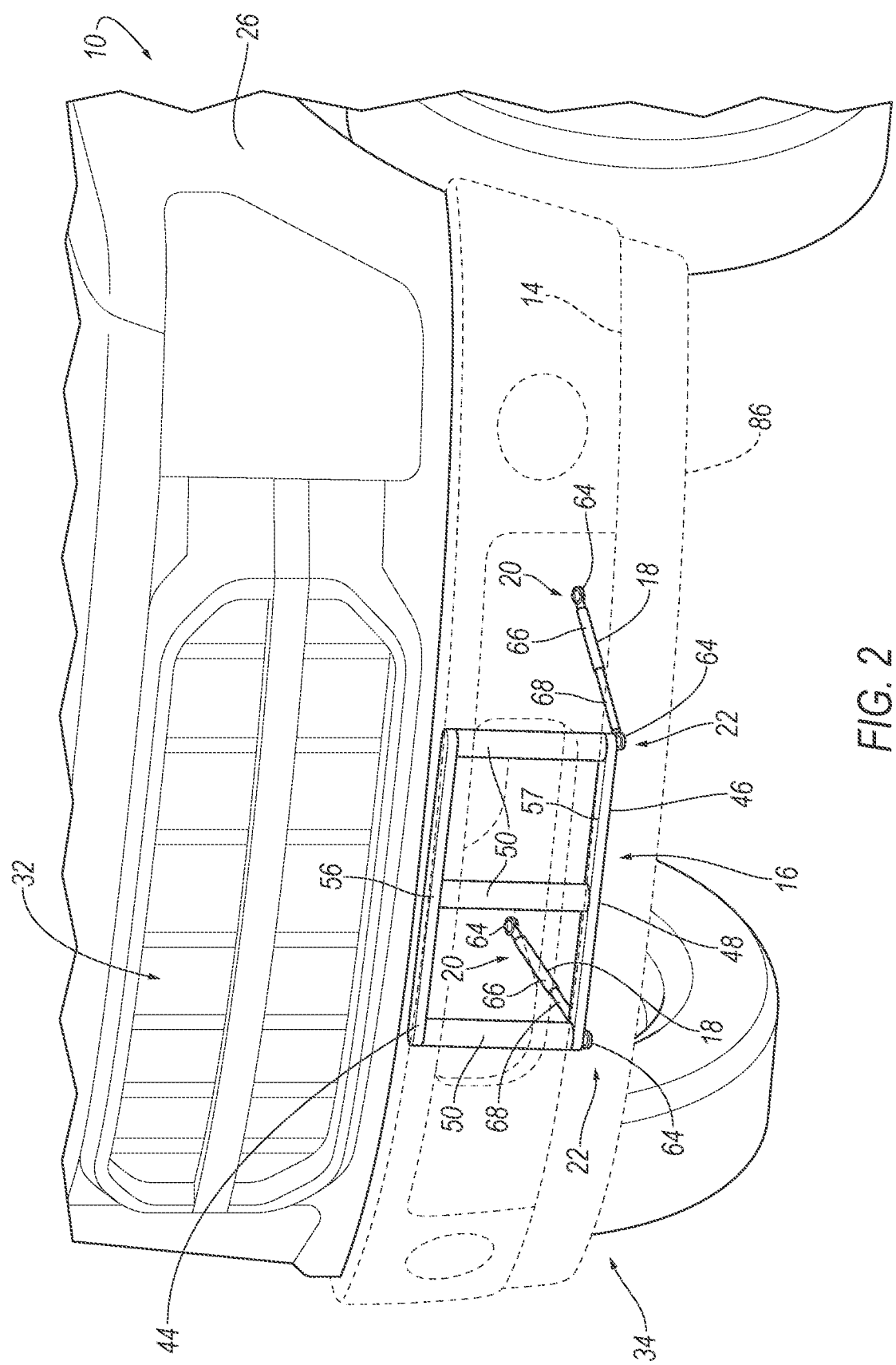
FIG. 2 is a magnified view of FIG. 1 with a bumper shown in hidden lines.
Figure 3:
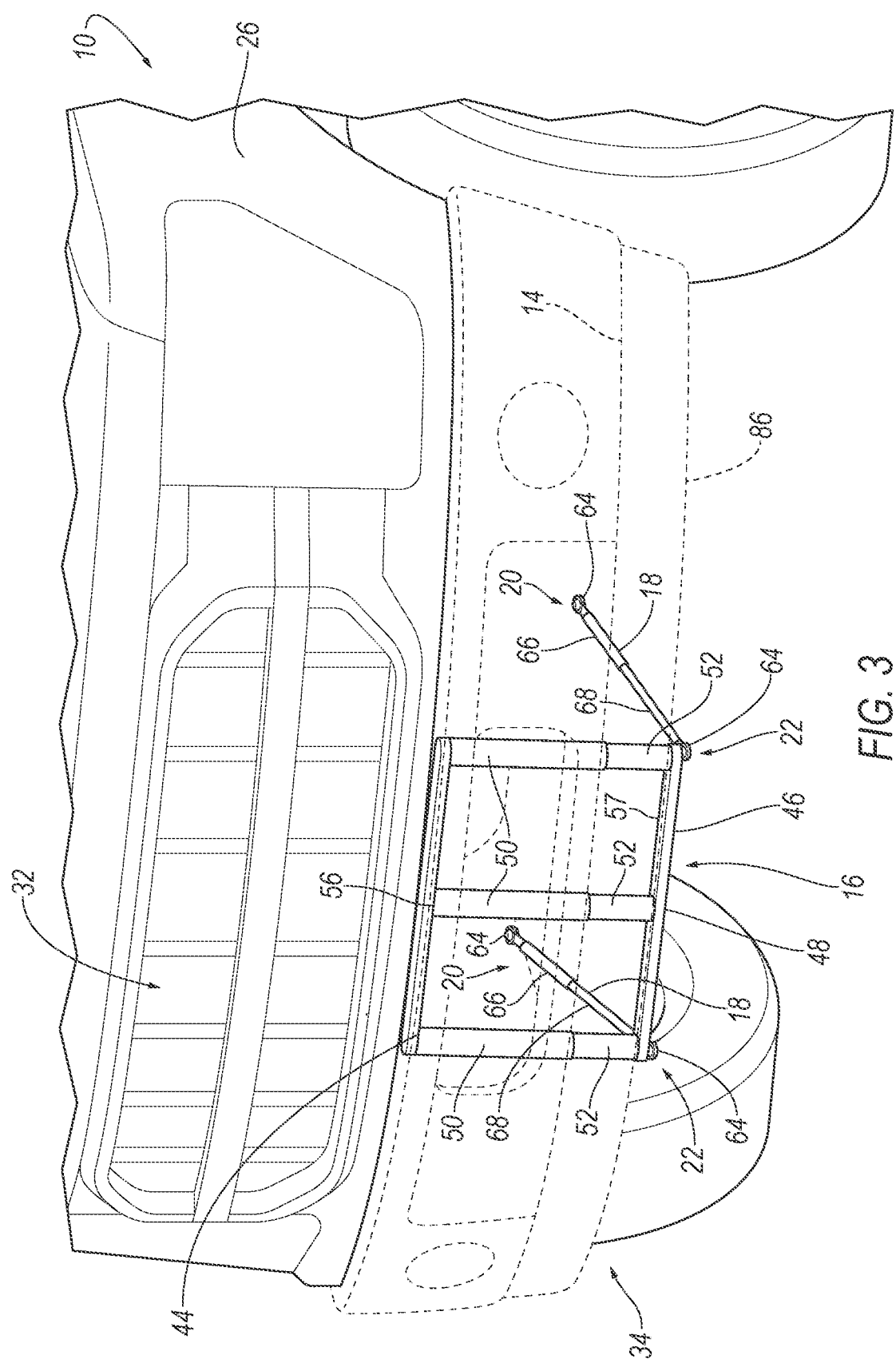
FIG. 3 is the magnified view of FIG. 2 with the bumper extension in a lowered position.

During normal operation of the vehicle 10, the bumper extension 16 is in the raised position, as shown in FIGS. 1 and 2. During a sensed vehicle impact, e.g., a vehicle-to-vehicle impact, the bumper extension 16 is moved downward relative to the bumper 14 to the lowered position, as shown in FIG. 3. In the lowered position, the bumper extension 16 effectively increases the size of the vertical dimension of the bumper 14 to increase the likelihood that energy absorption features of the vehicle 10 are vertically aligned with energy absorption features of the other vehicle 10 in a vehicle-to-vehicle impact. As an example, in an example in which the vehicle 10 has a relatively high ride height, the bumper extension 16 in the lowered position increases the likelihood of vertical alignment with a vehicle 10 that has a relatively low ride height.

The vehicle 10 may be any suitable type of automobile, e.g., a passenger or commercial automobile such as a sedan, a coupe, a truck, a sport utility vehicle 10, a crossover vehicle 10, a van, a minivan, a taxi, a bus, etc. The vehicle 10, as an example, may have a relatively high ride height.

The vehicle 10 includes the vehicle frame 12 and a vehicle body 26. The vehicle body 26 and the vehicle frame 12 may have a body-on-frame construction (also referred to as a cab-on-frame construction) in which the body and frame are separate components, i.e., are modular, and the body is supported on and affixed to the frame. In the example shown in the Figures, the vehicle 10 has a body-on-frame construction. As another example, the vehicle body 26 and the vehicle frame 12 may be of a unibody construction in which the vehicle frame 12 is unitary with the vehicle body 26 (including frame rails 28, pillars, roof rails, etc.). Alternatively, the frame and body may have any suitable construction. The frame and body may be of any suitable material, for example, steel, aluminum, and/or fiber-reinforced plastic, etc.

Figure 4:
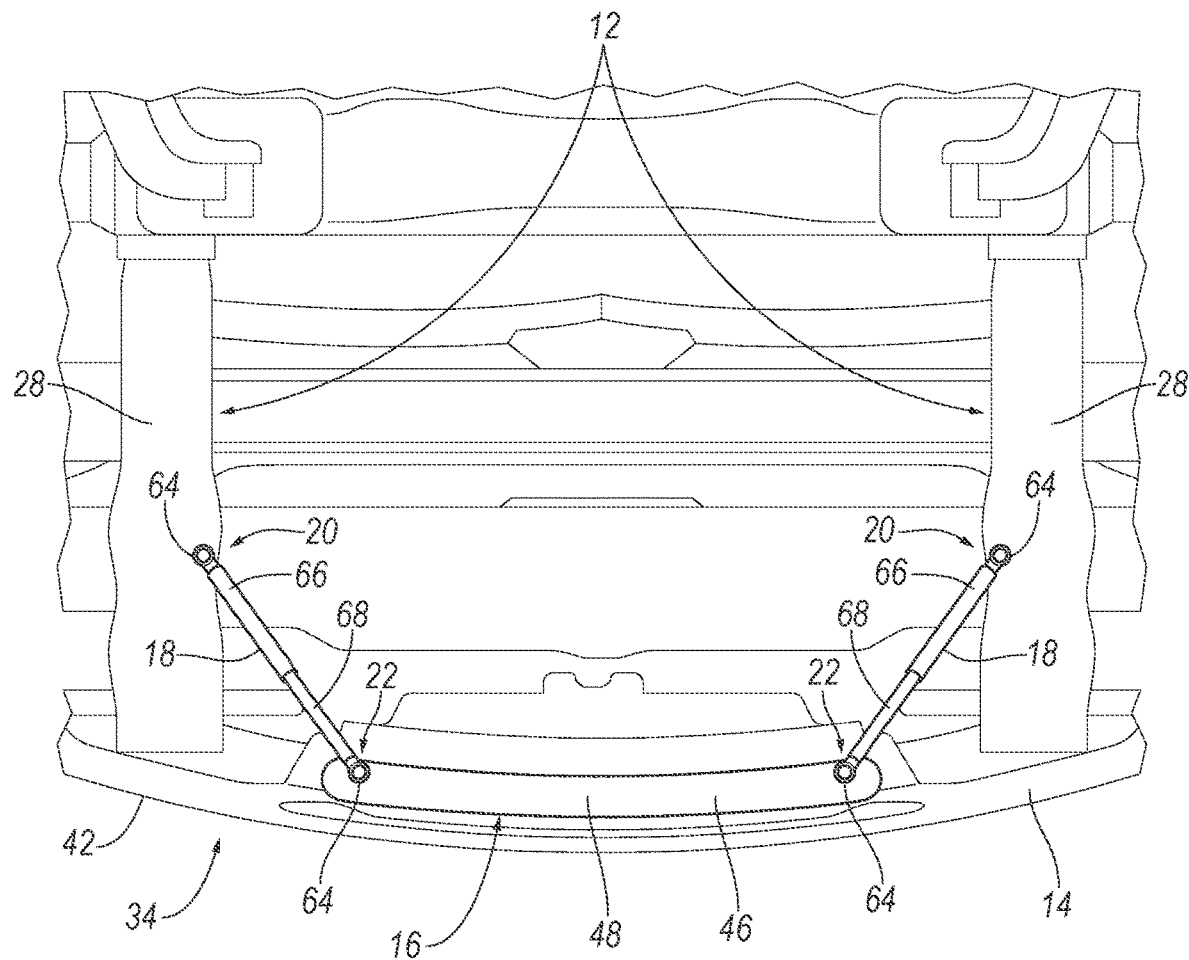
FIG. 4 is a bottom view of a portion of the vehicle.

In the example shown in the Figures, the vehicle frame 12 may include frame rails 28 that are elongated along a vehicle-longitudinal axis, with reference at least to FIG. 4. The frame rails 28 may, for example, include energy absorbers configured to absorb energy during a vehicle-to-vehicle impact. For example, the frame rails 28 may include crush-initiators, crush cans, crumple zones, etc.

With reference to FIGS. 1-3, the vehicle 10 has a front-end structure. The front-end structure includes a grill 32 and a bumper assembly 34. The grill 32 is above the bumper assembly 34. The grill 32 may be a component of the vehicle body 26 and may be supported on other components of the vehicle body 26.

The bumper assembly 34 includes the bumper 14, the bumper extension 16, and the reinforcement 18. The bumper 14 is supported by the vehicle frame 12, the bumper extension 16 is supported by the bumper 14, and the reinforcement 18 is connected to the bumper extension 16 and the vehicle frame 12.

Figure 5:
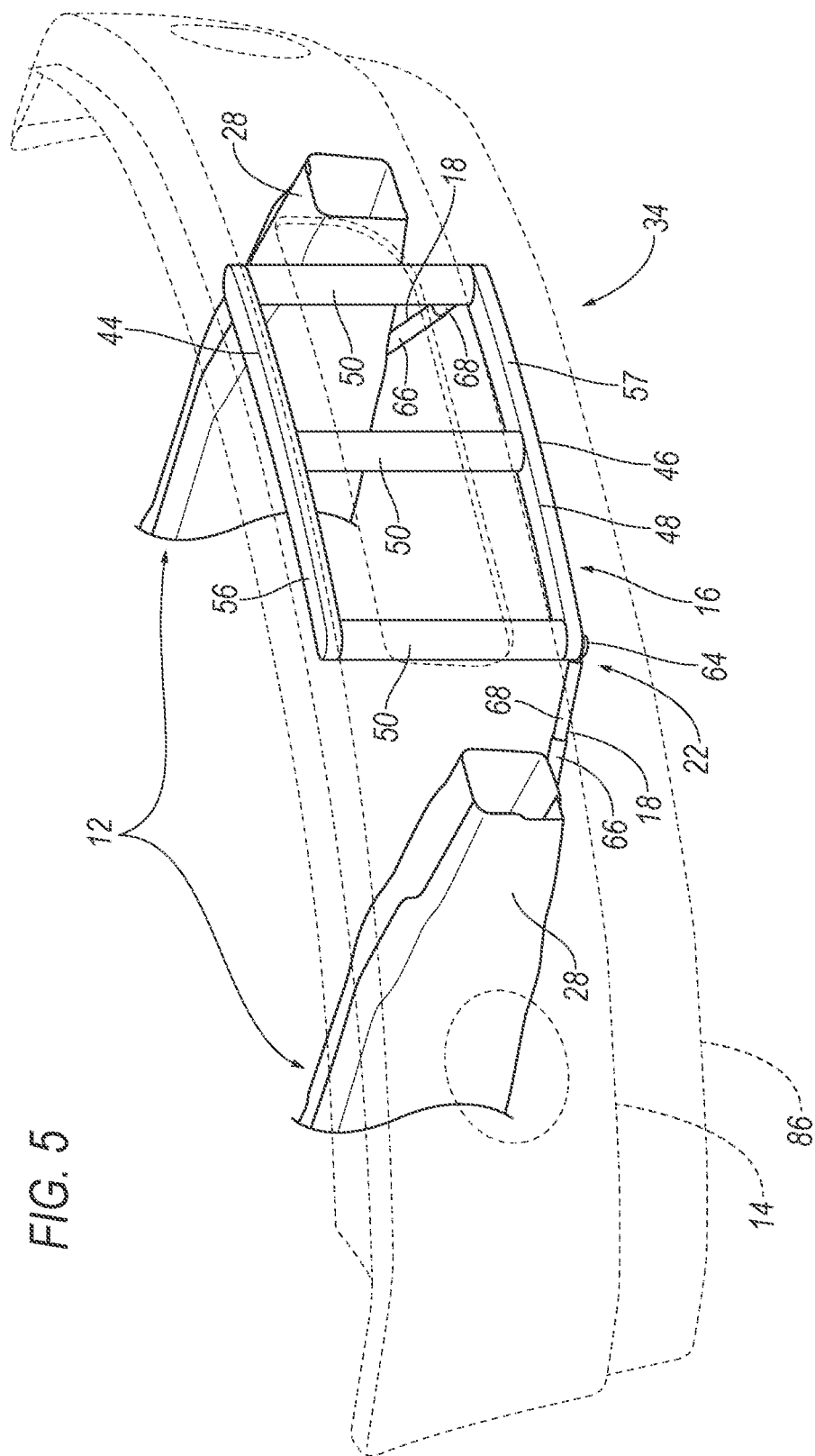
FIG. 5 is a perspective view of the bumper and the bumper extension in the raised position.
Figure 6:
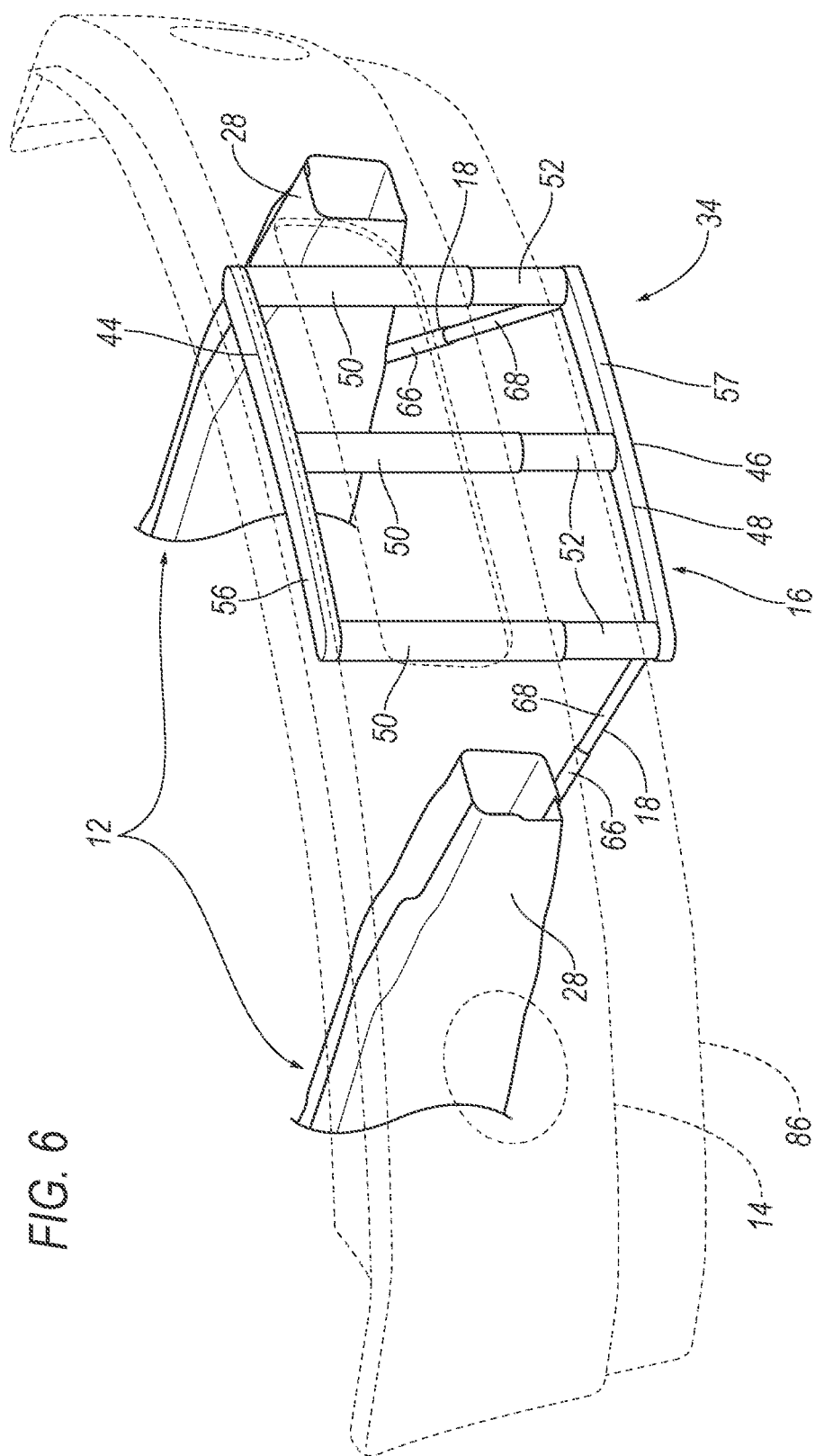
FIG. 6 is a perspective view of the bumper and the bumper extension in a lowered position.

With reference to FIGS. 4-6, the bumper assembly 34 is connected to the vehicle frame 12. Specifically, the bumper 14 is connected to the vehicle frame 12. The bumper 14 may be connected to the frame rails 28. Specifically, in such an example, the frame rails 28 are elongated along a vehicle-longitudinal axis and the bumper extends transversely to the frame rails, e.g., in a cross-vehicle direction. The bumper 14, for example, may be connected directly to the vehicle frame 12 and by any suitable way including fasteners, welding, etc. The bumper 14 is supported by the vehicle frame 12, i.e., the weight of the bumper 14 is borne by the vehicle frame 12. The bumper assembly 34 may be a front bumper assembly, as shown in the Figures. In other words, the bumper assembly 34 may be at a front of the vehicle 10 and, in such examples, the bumper extension 16 is operable for frontal collisions of the vehicle 10. In another example, the bumper assembly 34 may be at a rear bumper assembly, i.e., the bumper assembly 34 may be at a rear of the vehicle 10 and the bumper extension 16 may be operable for rear collisions of the vehicle 10.

With reference to FIGS. 1-3, the bumper 14 is elongated along the cross-vehicle direction CV. The bumper 14 has a vehicle-forward face 42. The vehicle-forward face 42 may be a class-A surface, i.e., a surface specifically manufactured to have a high-quality, finished aesthetic appearance free of blemishes. The bumper 14 may be of any suitable material such as metal (steel, aluminum, etc.), fiber-reinforced plastic, etc.

With reference to FIGS. 5 and 6, the bumper extension 16 is supported by the bumper 14. In other words, the weight of the bumper extension 16 is born by the bumper 14. The bumper 14 supports the bumper extension 16 on the vehicle frame 12. The bumper extension 16 is centered cross-vehicle 10 on the bumper 14. As set forth above, the bumper 14 may be a front bumper assembly, as shown in the Figures, or a rear bumper assembly of the vehicle 10. In other words, the bumper extension 16 may be at a front of the vehicle 10 and/or another bumper extension 16 may be at a rear of the vehicle 10.

The bumper extension 16 may, for example, include a base 44 fixed relative to the bumper 14 and moveable member 48 moveable downwardly relative to the bumper 14 from the raised position to the lowered position. The base 44 is fixed relative to the bumper 14 in that the base 44 does not move relative to the bumper 14, i.e., the bumper 14 and the base 44 are a unit. The moveable member 48 moves relative to both the base 44 and the bumper 14 from the raised position to the lowered position. The base 44 and the moveable member 48 may be rigid relative to the bumper 14, i.e., as rigid as or more rigid than the bumper 14, to transfer force to the bumper 14 during a vehicle impact.

As set forth above, the bumper extension 16 is moveable downwardly relative to the bumper 14 from the raised position to the lowered position. For example, the moveable member 48 moves relative to the bumper 14 from the raised position to the lowered position. In the raised position, the base 44 and the moveable member 48 may be higher than the bumper 14 and, in the lowered position, the moveable member 48 may be lower than the bumper 14. Specifically, a bottom-most surface 46 of the bumper extension 16 is above a bottom-most surface 86 of the bumper 14 when the bumper extension 16 is in the raised position and the bottom-most surface 46 of the bumper extension 16 is below the bottom-most surface 86 of the bumper 14 when the bumper extension 16 is in the lowered position.

The moveable member 48 may, for example, move linearly from the raised position to the lowered position, as in the example show in the Figures. Alternatively, the moveable member 48 may move in any suitable path from the raised position to the lowered position. As an example of linear movement, the bumper extension 16 may be telescopically coupled to the bumper 14. Specifically, in the example shown in the Figures, the base 44 is fixed relative to the bumper 14 and the moveable member 48 is telescopically engaged with the base 44 of the bumper extension 16. In such an example, the base 44 includes a bar 50 and the moveable member 48 includes a bar 52 telescopically engaged with the bar 50 of the base 44. In other words, one of bars 50, 52 defines a bore that telescopically receives the other bar 50, 52. The bars 50, 52 and the bore may have any suitable cross-sectional shape.

In the example shown in the Figures, the base 44 includes three bars 50 spaced cross-vehicle 10 from each other and the moveable member 48 includes three bars 52 spaced cross-vehicle 10 from each other. The bars 50 of the base 44 and the bars 52 of the moveable member 48 are positioned so that the bars 50 of the base 44 telescopically engage the bars 52 of the moveable member 48, respectively. In the example shown in the Figure, the three bars 50 of the base 44 define the bores. In other examples, the bores may be on any one of the respective pairs of bars 50, 52 and, for each bore, the respective bar 50, 52 on the other of the base 44 and the moveable member 48 is received in the bore. In the example shown in the Figures, the bar 50, 52 and the bore have a circular cross-sectional shape.

In the examples including multiple bars 50, 52 spaced cross-vehicle 10, the base 44 may include a cross member 56 extending across the bars 50 and/or the moveable member 48 may include a cross member 57 extending across the bars 52. In such examples, the bars 50 of the base 44 may be fixed to the cross member 56 of the base 44 in any suitable way and the bars 52 of the moveable member 48 may be fixed to the cross member 57 of the moveable member 48 in any suitable way, e.g., welding, fasteners, etc. The cross member 56 and/or the bars 50 of the base 44 may be fixed to the bumper 14. The cross member 57 of the moveable member 48 may be the bottom-most component of the moveable member 48 and may present the bottom-most surface 46.

The bumper assembly 34 includes an actuator 58 to move the moveable member 48 relative to the base 44 from the raised position to the lowered position. The actuator 58 may, for example, be a pyrotechnic device 60 between the bumper 14 and the bumper extension 16. Specifically, the pyrotechnic device 60 may be between the bumper 14 and the moveable member 48, and more specifically, between the base 44 and the moveable member 48. In examples including the bars 50, 52 telescopically engaged with each other, the pyrotechnic device 60 may be between the bars 50, 52. As an example, the pyrotechnic device 60 may be housed in one of the bars 50, 52 and engaged with the other of the bars 50, 52 to move the bars 50, 52 relative to each other. In the examples in which the assembly includes multiple pairs of bars 50, 52, the bumper assembly 34 may include one pyrotechnic device 60 between the bars 50, 52 of a pair or may include more than one pyrotechnic device 60 for different ones of the pairs of bars 50, 52.

The pyrotechnic device 60 includes a pyrotechnic charge. The pyrotechnic charge is activated to activate the pyrotechnic device 60, e.g., by the computer 80 described below. The pyrotechnic device 60 may be, for example, a linear pyrotechnic actuator 58. In such an example, for example, the pyrotechnic device 60 may include a housing and the pyrotechnic charge drives a piston relative to the housing to move the moveable member 48 relative to the base 44.

As set forth above, the actuator 58 may be a linear actuator between the bumper 14 and the bumper extension 16. In the example in which the actuator is the pyrotechnic device as described above the linear actuator may be a pyrotechnic linear actuator. As other examples, the actuator 58 may be a solenoid, a stepper motor linear actuator, screw-type linear actuator, etc.

With reference to FIGS. 5-6, the reinforcement 18 extends from the bumper extension 16. to the vehicle frame 12. In particular, the reinforcement 18 extends from the moveable member 48 of the bumper extension 16 to the vehicle frame 12, e.g., the frame rail 28. The reinforcement 18 backs up the bumper extension 16 to resist deformation of the bumper extension 16. In other words, during a vehicle impact, the reinforcement 18 transfers forces from the bumper extension 16 to the vehicle frame 12. In the example shown in the Figures, the bumper assembly 34 includes two reinforcements 18 spaced from each other cross-vehicle 10. The bumper assembly 34 may have any suitable number of reinforcements 18.

The reinforcement 18 may be telescopic. Specifically, the reinforcement 18 may be designed to telescopically elongate as the bumper extension 16 moves from the raised position to the lowered position. As described further below, the reinforcement 18 may lock 24 when the bumper extension 16 is in the lowered position to transfer force from the bumper extension 16 to the vehicle frame 12.

As set forth above, the reinforcement 18 has the first end 20 fixed relative to vehicle frame 12 and the second end 22 fixed relative to the bumper extension 16. In other words, the first end 20 moves as a unit with the vehicle frame 12 and the second end 22 moves as a unit with the bumper extension 16. As the bumper extension 16 moves from the raised position to the lowered position, the first end 20 maintains attachment of the reinforcement 18 to the vehicle frame 12 and the second end 22 moves with the bumper extension 16. The reinforcement 18 is supported by the vehicle frame 12 and the bumper extension 16. Specifically, the first end 20 is supported by the vehicle frame 12 and the second end 22 is supported by the bumper extension 16, i.e., the weight of the reinforcement 18 is borne by the vehicle frame 12 at the first end 20 of the reinforcement 18 and the weight of the reinforcement 18 is borne by the bumper extension 16 at the second end 22 of the reinforcement 18.

The reinforcement 18, as an example, may be hinged to the bumper 14 reinforcement 18 and the vehicle frame 12. For example, the reinforcement 18 may include a ball joint 64 at the first end 20 connecting the reinforcement 18 to the vehicle frame 12 and may include a ball joint 64 at the second end 22 connecting the reinforcement 18 to the bumper extension 16.

As set forth above, the reinforcement 18 may be telescopic. For example, the reinforcement 18 may have a first rod 66 and a second rod 68 telescopically coupled with each other. In other words, one of rods 66, 68 defines a bore 70 that telescopically receives the other rod. The rods 66, 68 and the bore 70 may have any suitable cross-sectional shape. The first rod 66 has the first end 20 of the reinforcement 18 and the second rod 68 has the second end 22 of the reinforcement 18.

The reinforcement 18 includes the lock 24 fixing the first end 20 and the second end 22 of the reinforcement 18 relative to each other when the bumper extension 16 is in the lowered position. Specifically, the lock 24 allows the bumper extension 16 to move to the lowered position and allows the lock 24 to move accordingly. When the bumper extension 16 reaches the lowered position, the lock 24 fixes the first end 20 and the second end 22 relative to each other to maintain the bumper extension 16 in the lowered position. In the example in the Figures in which the reinforcement 18 has the first rod 66 and the second rod 68 telescopically coupled with each other, the lock 24 fixes the first rod 66 to the second rod 68 when the bumper extension 16 is in the lowered position. The lock 24 allows relative movement of the first rod 66 and the second rod 68 before movement of the bumper extension 16 to the lowered position.

Figure 7A:
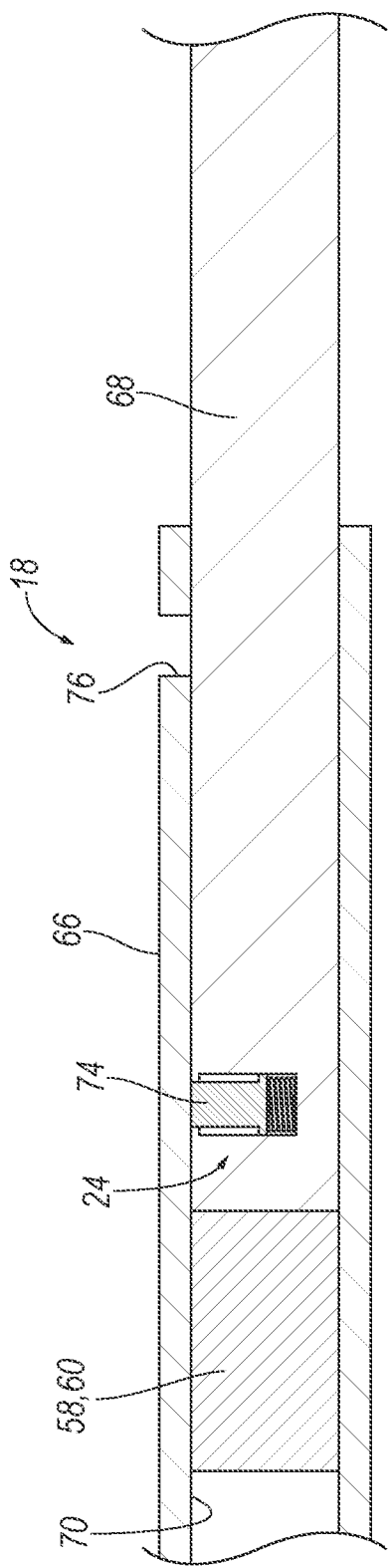
FIG. 7A is a partial cross-sectional view of a reinforcement when the bumper extension is in the raised position.
Figure 7B:
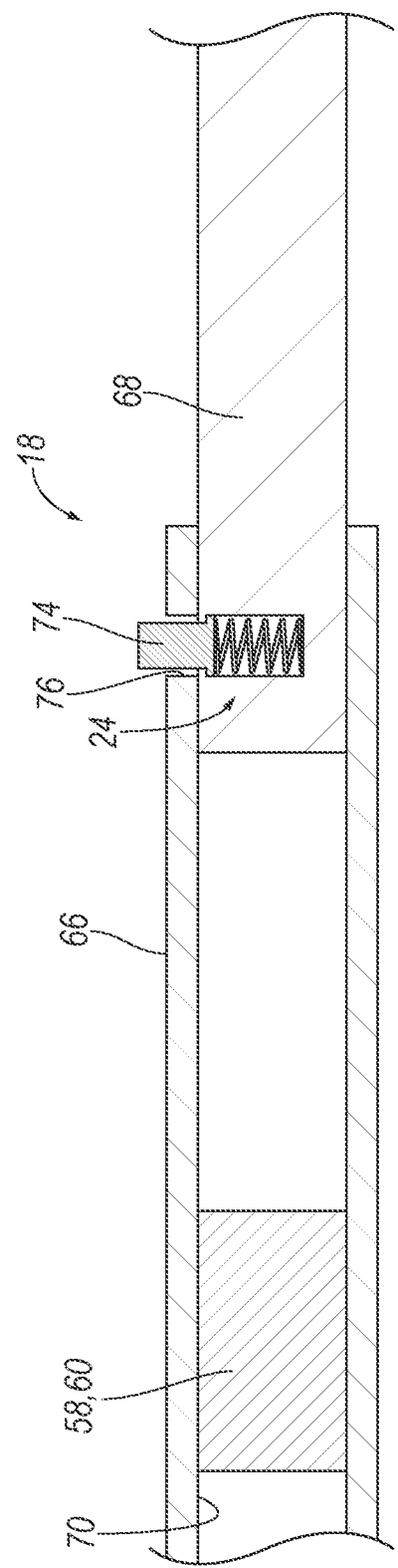
FIG. 7B is the partial cross-sectional view of the reinforcement when the bumper is in the lowered position.

In the example, in which the reinforcement 18 includes the first rod 66 and the second rod 68, the lock 24 may be supported by one of the first rod 66 and second rod 68 and engages the other of the first rod 66 and second rod 68 when the bumper extension 16 is in the lowered position. For example, with reference to FIGS. 7A-B, the lock 24 may include a spring-loaded pin 74 on one of the first rod 66 and second rod 68 and the other of the first rod 66 and second rod 68 includes a hole 76 that receives the spring-loaded pin 74 when the bumper extension 16 is in the lowered position. Accordingly, when the bumper extension 16 reaches the lowered position, the spring forces the pin into the hole 76 to lock 24 the first rod 66 relative to the second rod 68.

Figure 8:
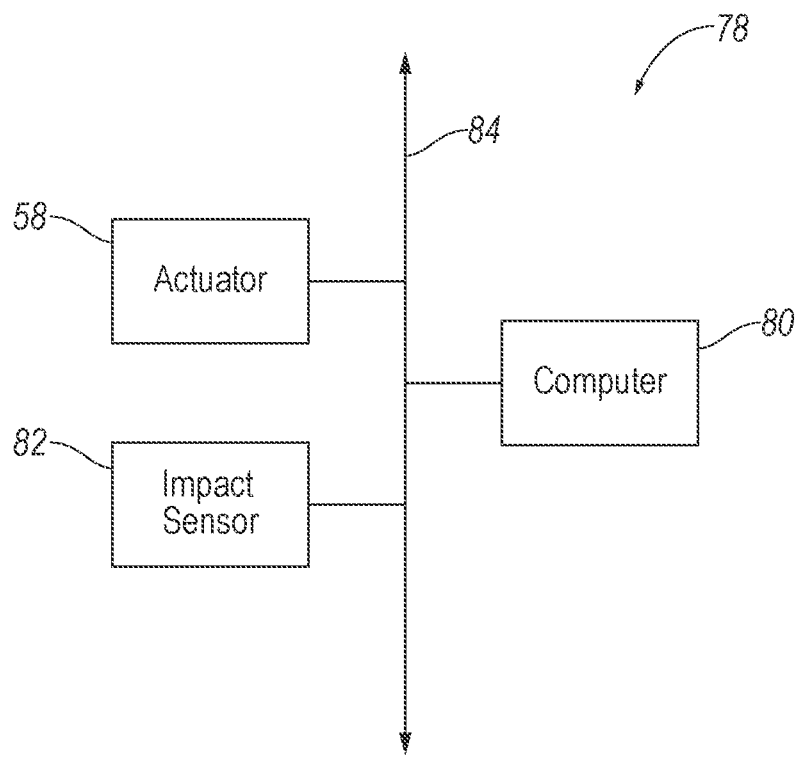
FIG. 8 is a block diagram of a control system of the vehicle.

With reference to FIG. 8, the vehicle 10 may include a control system 78. The control system 78 may include a computer 80, an impact sensor 82, and the actuator 58 in communication through a communication network. The computer 80 may be programmed to activate the actuator 58 to move the moveable member 48 relative to the base 44 to the lowered position.

The vehicle 10 may include one or more of the impact sensors 82. The impact sensor 82 senses impact of the vehicle 10. The computer 80 may activate the actuator 58, e.g., provide an impulse to a pyrotechnic charge of the actuator 58, when the impact sensor 82 senses an impact of the vehicle 10. Alternatively or additionally to sensing impact, the impact sensor 82 may be configured to sense impact prior to impact, i.e., pre-impact sensing. The impact sensor 82 is in communication with the computer 80 directly or indirectly. The impact sensor 82 may be of any suitable type, for example, post-contact sensors such as accelerometers, pressure sensors, and contact switches; and pre-impact sensors 82 such as radar, LIDAR, and vision-sensing systems. The vision-sensing systems may include one or more cameras, CCD image sensors, CMOS image sensors, etc. The impact sensor 82 may be located at numerous points in or on the vehicle 10.

The computer 80 may be a microprocessor-based computing device implemented via circuits, chips, or other electronic components. The computer 80 may include a processor, memory, etc. The memory of the computer 80 may store instructions executable by the processor and the processor may read the instructions from the memory and execute the instructions. The computer 80 may be, for example, a restraint control module (RCM). Computing devices, such as the computer 80, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A computer readable medium (also referred to as a processor-readable medium) includes any non-transitory (e.g., tangible) medium that participates in providing data (e.g., instructions) that may be read by a computer 80 (e.g., by a processor of a computer 80). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer 80. Common forms of computer readable media include, for example, RAM, a PROM, an EPROM, a FLASH-EEPROM, any other memory chip or cartridge, or any other medium from which a computer 80 can read. In some examples, system elements may be implemented as computer readable instructions (e.g., software) on one or more computing devices (e.g., servers, personal computers, etc.), stored on computer 80 readable media associated therewith (e.g., disks, memories, etc.). A computer 80 program product may comprise such instructions stored on computer 80 readable media for carrying out the functions described herein.

The control system 78 may transmit signals through the communications network 84 such as a controller area network (CAN) bus, Ethernet, Local Interconnect Network (LIN), and/or by any other wired or wireless communications network 84.

The computer 80 is programmed to move the bumper extension 16 to the lowered position in response to detected frontal-vehicle impact. Specifically, as set forth above, in the example in which the bumper assembly 34 includes the pyrotechnic device 60, the computer 80 is programmed to activate the pyrotechnic device 60 in response to detected vehicle impact, e.g., frontal impact. The use of "in response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a vehicle frame;
a bumper supported by the vehicle frame;
a bumper extension supported by the bumper and moveable downwardly relative to the bumper from a raised position to a lowered position;
the bumper extension including a base fixed relative to the bumper and a moveable member telescopically engaged with the base of the bumper extension; and
a reinforcement having a first end fixed relative to the vehicle frame and a second end fixed relative to the bumper extension, the reinforcement including a lock fixing the first end and the second end of the reinforcement relative to each other when the bumper extension is in the lowered position.

2. The vehicle as set forth in claim 1, wherein the reinforcement has a first rod having the first end and a second rod having a second end, the first rod and the second rod being telescopically coupled with each other.

3. The vehicle as set forth in claim 2, wherein the lock fixes the first rod to the second rod when the bumper extension is in the lowered position.

4. The vehicle as set forth in claim 3, wherein the lock allows relative movement of the first rod and the second rod before movement of the bumper extension to the lowered position.

5. The vehicle as set forth in claim 3, wherein the lock includes a spring-loaded pin on one of the first rod and second rod and the other of the first rod and second rod includes a hole that receives the spring-loaded pin when the bumper extension is in the lowered position.

6. The vehicle as set forth in claim 2, wherein the lock is supported by one of the first rod and second rod and engages the other of the first rod and second rod when the bumper extension is in the lowered position.

7. The vehicle as set forth in claim 1, wherein the moveable member includes two rods telescopically engaged with the base and a cross member extending from one rod to the other rod.

8. The vehicle as set forth in claim 1, further comprising a pyrotechnic device between the base and the moveable member.

9. The vehicle as set forth in claim 1, further comprising a pyrotechnic device between the bumper and the bumper extension.

10. The vehicle as set forth in claim 1, further comprising a linear actuator between the bumper and the bumper extension.

11. The vehicle as set forth in claim 1, wherein the bumper extension is centered cross-vehicle on the bumper.

12. The vehicle as set forth in claim 1, wherein a bottom-most surface of the bumper extension is below a bottom-most surface of the bumper when the bumper extension is in the lowered position.

13. The vehicle as set forth in claim 1, further comprising a computer having a processor and a memory storing instructions executable by the processor to move the bumper extension to the lowered position in response to a detected frontal-vehicle impact.

14. The vehicle as set forth in claim 13, further comprising a pyrotechnic device between the bumper and the bumper extension, the memory storing instructions executable by the processor to activate the pyrotechnic device in response to detected frontal-vehicle impact.

15. The vehicle as set forth in claim 1, wherein the reinforcement is hinged to the bumper extension and the vehicle frame.

16. A vehicle comprising:
a vehicle frame;
a bumper supported by the vehicle frame;
a bumper extension supported by the bumper and moveable downwardly relative to the bumper from a raised position to a lowered position;
a reinforcement having a first end fixed relative to the vehicle frame and a second end fixed relative to the bumper extension, the reinforcement including a lock fixing the first end and the second end of the reinforcement relative to each other when the bumper extension is in the lowered position; and
a pyrotechnic device between the bumper and the bumper extension.

17. A vehicle comprising:
a vehicle frame;
a bumper supported by the vehicle frame;
a bumper extension supported by the bumper and moveable downwardly relative to the bumper from a raised position to a lowered position;
a reinforcement having a first end fixed relative to the vehicle frame and a second end fixed relative to the bumper extension, the reinforcement including a lock fixing the first end and the second end of the reinforcement relative to each other when the bumper extension is in the lowered position; and
a computer having a processor and a memory storing instructions executable by the processor to move the bumper extension to the lowered position in response to a detected frontal-vehicle impact.

18. The vehicle as set forth in claim 17, further comprising a pyrotechnic device between the bumper and the bumper extension, the memory storing instructions executable by the processor to activate the pyrotechnic device in response to detected frontal-vehicle impact.

19. The vehicle as set forth in claim 17, wherein the bumper extension is telescopically coupled to the bumper.

\* \* \* \* \*